(No Model.) 3 Sheets—Sheet 1.
J. F. GEBHARDT.
MACHINE FOR TURNING MOLDINGS.
No. 399,871. Patented Mar. 19, 1889.
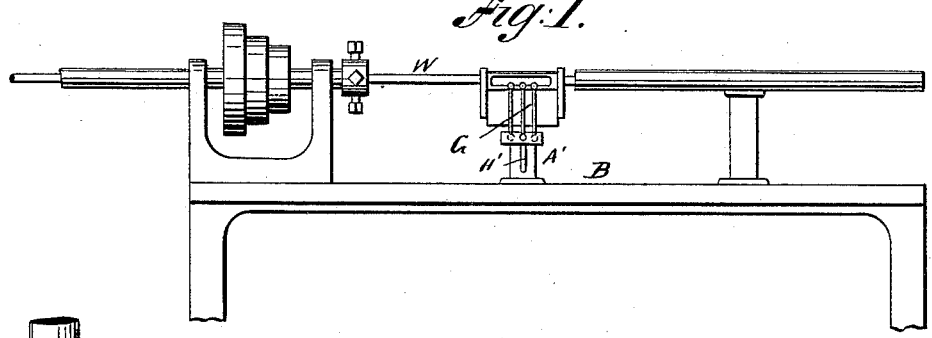
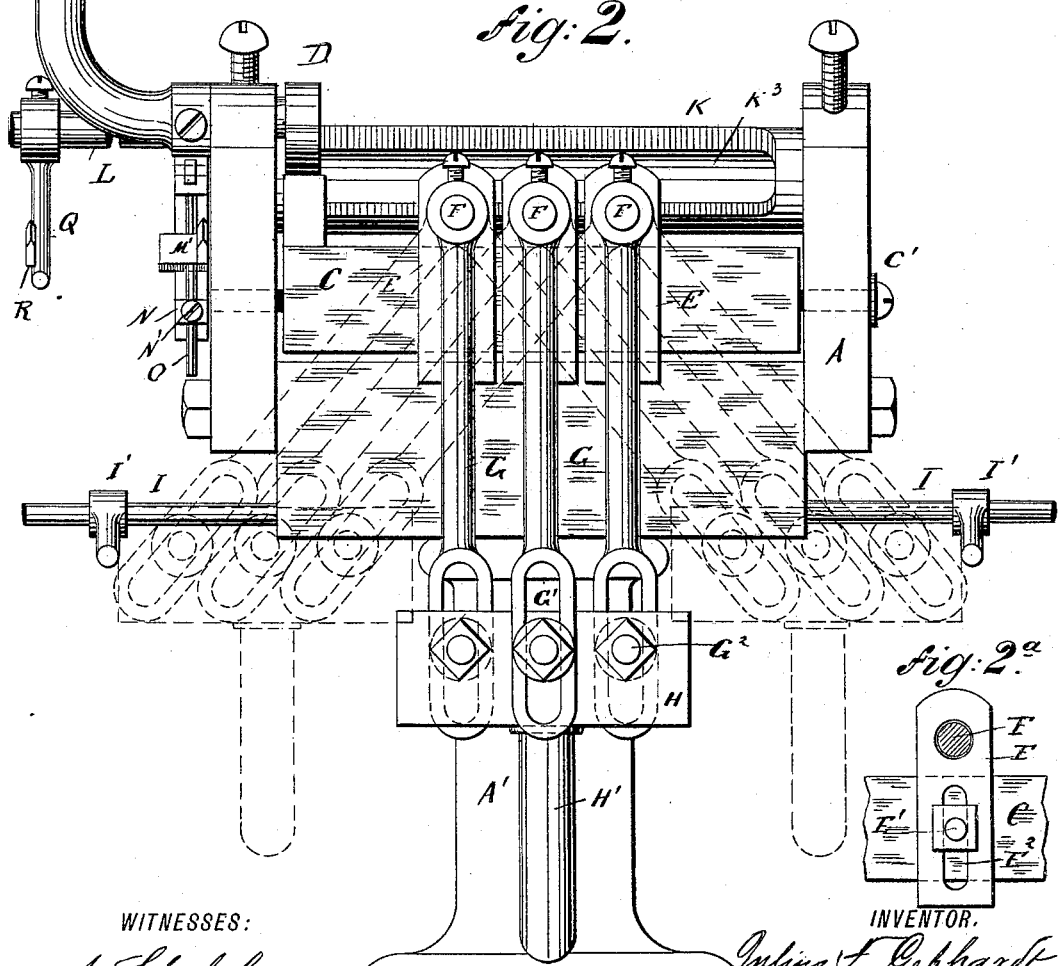
WITNESSES:
A. Schehl.
Carl Karn
INVENTOR.
Julius F. Gebhardt
BY Goepel & Raegener
ATTORNEYS.

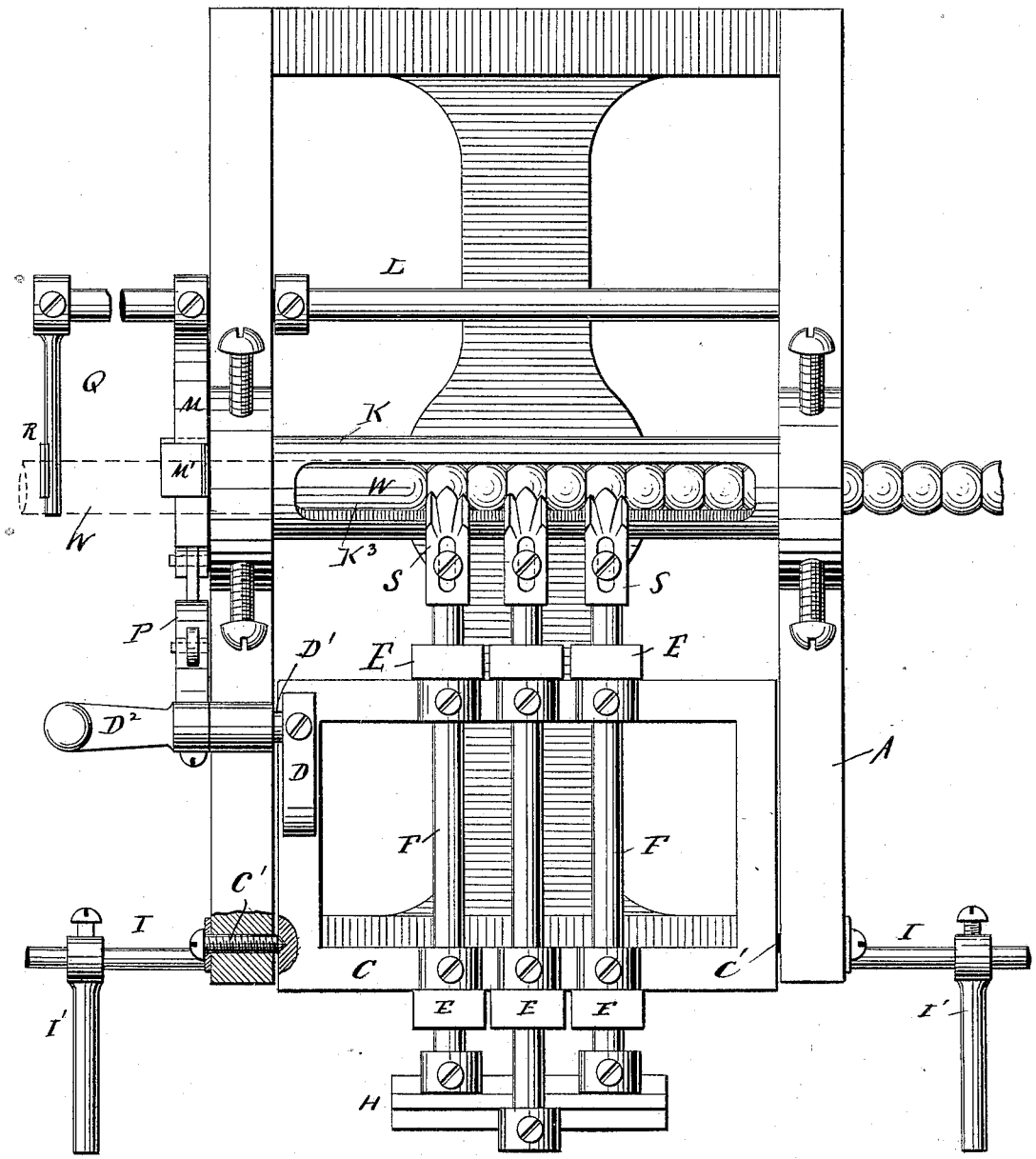

(No Model.)  3 Sheets—Sheet 3.
J. F. GEBHARDT.
MACHINE FOR TURNING MOLDINGS.
No. 399,871. Patented Mar. 19, 1889.
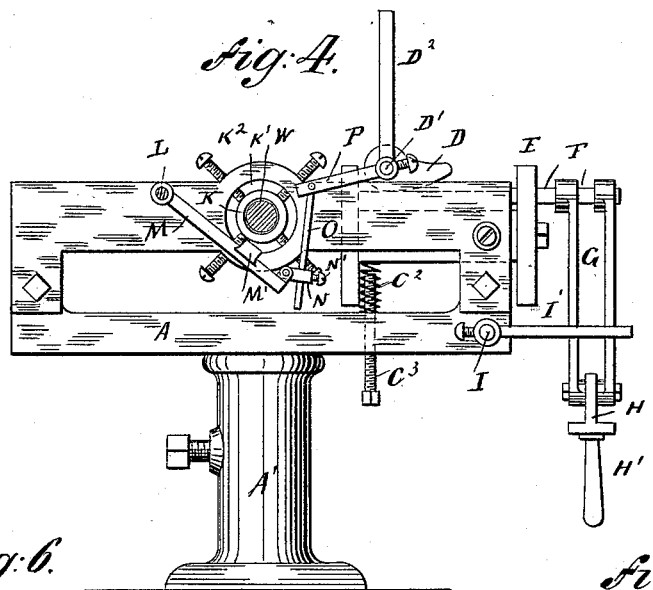
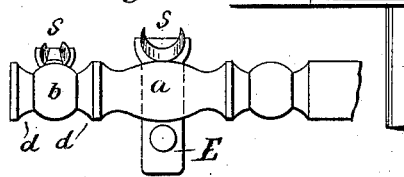
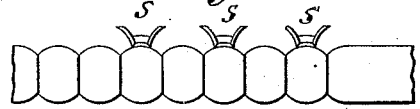
 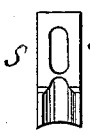
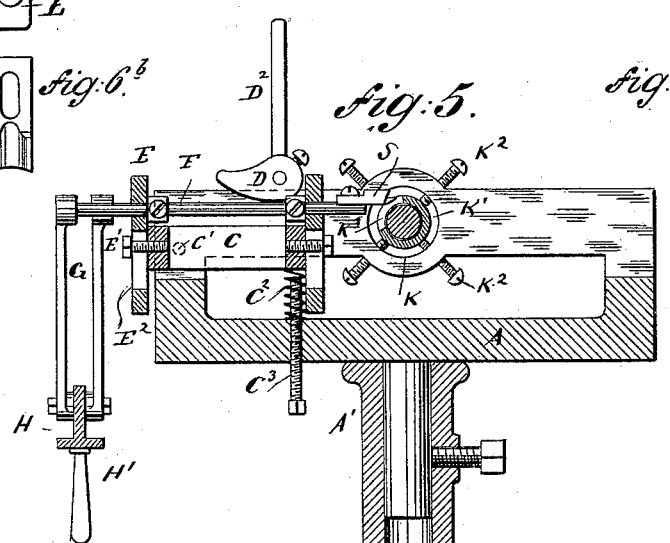
WITNESSES:
A. Schehl,
Carl Kark
INVENTOR,
Julius F. Gebhardt
BY Goepel & Raegner
ATTORNEYS.

UNITED STATES PATENT OFFICE.

JULIUS F. GEBHARDT, OF PORT CHESTER, NEW YORK.

MACHINE FOR TURNING MOLDINGS.

SPECIFICATION forming part of Letters Patent No. 399,871, dated March 19, 1889.

Application filed October 1, 1888. Serial No. 286,887. (No model.)

*To all whom it may concern:*

Be it known that I, JULIUS F. GEBHARDT, of Port Chester, in the county of Westchester, State of New York, have invented certain new and useful Improvements in Machines for Turning Moldings, of which the following is a specification.

This invention relates to improvements in machines for turning moldings; and the object of my invention is to provide a new and improved attachment for turning-lathes of simple construction, by means of which moldings of different shapes can be turned very true and accurately and very rapidly.

The invention consists of the combination, with a frame, of a swinging frame in the same, a series of rock-shafts in the swinging frame, cutters on the rock-shaft, and rods connecting the several rock-shafts with the common handle-pieces.

The invention also consists in the construction and combination of parts and details, as will be fully described hereinafter, and finally pointed out in the claims.

In the accompanying drawings, Figure 1 is an elevation of a turning-lathe provided with my improvement. Fig. 2 is an enlarged front elevation of my improvement, parts being broken out. Fig. $2^a$ is a detail sectional view showing the device for adjusting the rocking levers vertically. Fig. 3 is a plan view of my improved attachment for turning-lathes, parts being broken out and others in section. Fig. 4 is a side view of my improved attachment, parts being in section. Fig. 5 is a vertical transverse sectional view of the same. Fig. 6 is a side view of a piece of molding and end views of the knives used for making the same. Figs. $6^a$ and $6^b$ are inner face views of said knives or cutters. Fig. 7 is a face view of another molding and end views of the knives or cutters for the same. Fig. $7^a$ is an inner face view of one of said cutters.

Similar letters of reference indicate corresponding parts.

The frame A is held vertically adjustable in a tubular standard, A', that can be placed upon the bed-plate B of the lathe and moved in the direction of the length of said bed-plate. In the frame A another frame, C, is pivoted by means of pivots C' at the front end of the frame A—that is, at the end nearest the operator—so that the inner end of said frame C can swing up or down. A spiral spring, $C^2$, surrounds a screw, $C^3$, screwed through the bottom of the frame A, and presses the swinging frame C upward and against a cam, D, on one end of a rock-shaft, D', pivoted on a suitable bearing on the top of the frame A, the opposite end of said rock-shaft being provided with an upwardly-projecting lever, $D^2$, by means of which the cam can be manipulated. The screw $C^3$, which forms the guide for the spring $C^2$, can be raised and lowered so as to act as a check for the swinging frame C, to prevent the same being pressed downward too far.

On the outer surfaces of the front and rear sides of the swinging frame C a series of vertically-adjustable bearing-plates, E, are held by screws E', passed through longitudinal slots $E^2$ in said bearing-plates into the front and rear pieces of said swinging frame. In each two corresponding bearing-plates E on the front and back of the swinging frame a rock-shaft, F, is mounted.

On the outer end of each rock-shaft F a rod, G, is secured, each rod being provided at its lower end with a longitudinal slot, G'. The several rods G are connected by bolts $G^2$, passed through the slots G', with a plate, H, having a downwardly-projecting handle, H'. From each side of the frame A a rod, I, projects, and on each of said rods an adjustable check-piece, I', is held for the purpose of regulating the lateral movement of the swinging rods G. On the inner ends of the rocking shafts F the cutters S are held. A centering sleeve, K, provided with a longitudinal slot, $K^3$, and extending the length of the attachment, has its ends located within apertures K' in the side pieces of the frame A, and is held and adjusted by screws $K^2$.

On a rock-shaft, L, in the frame A, an arm, M, is fixed, which is provided with a marking or gage blade, M'. To the swinging end of said arm M a link, N, is pivoted, and through the same a rod, O, is passed and secured by means of a screw, N', in said link. The upper end of the rod O is pivoted to an arm, P, on the cam-shaft D'.

On the end of the shaft L an arm, Q, is held adjustably, which is provided on its swinging end with a marking or gage blade, R. The dowel W, from which the molding is turned, is passed through the guide-sleeve K, and the cutters S are so adjusted on the rock-shafts F F that they can cut into the rod, the cutting-edges of said cutters being pressed against the rod by means of the cam D. By pressing down the cam D, the arm M is raised, also the arm O on the shaft L, and the markers R and M' cut into the rod a certain distance from each other. During the time that the cutters are pressed down the handle H is swung to the left and then to the right, or vice versa, as shown in dotted lines in Fig. 2, whereby the molding is cut. The dowel W is then shifted to the right until the mark made by the marking-blade R is in line with the marking-blade M', as that brings the dowel in the proper position in relation to the cutters.

It is evident that the distance between the blades M' and R must be equal to the length of molding cut while swinging the rods G to the right and left.

The cutters have different shapes, according to the molding to be made. In Fig. 7 a molding composed of a series of beads is shown. These beads are cut in a single operation by three cutters, S. The bottom of the cutter has the same curvature as the beads, as have also the upwardly-projecting side wings of the cutter. The cutters are first swung to one side from the position shown in Fig. 7 to the left, Fig. 7, and thereby cut one half of the beads on which the cutters rest and one half of the beads to the left. When swung in opposite directions, they complete the bead on which they rest and the half-beads to the right, so that each cutter cuts one bead and the two half-beads at the opposite sides of the same. As soon as the handle D² is released, the spring C² presses the cutters upward, so as to permit shifting of the dowel to the desired length. To cut the molding shown in Fig. 7, the centers of the cutters must be in the same plane and all cutters swung alike. In case a molding such as shown in Fig. 6 is desired, different cutters are used. To cut the part shown at a, Fig. 6, a cutter is used, the cutting-edge of which is meniscus-shaped. The center on which this cutter swings must not be in the same plane with the axis of the molding, but some distance below the same, as such cutter must have a rolling motion, as indicated in dotted lines. To adjust the cutter in this position, the plates E of the rocking shaft F, on which said cutter is held, are adjusted higher than the plates of the remaining shafts. To cut the moldings b, Fig. 6, a different cutter is used, the bottom of which is concave and the side convex. The bottom cuts the part b and the convex side of the parts d, the cutter being first rocked to one side and then to the other.

I have shown three cutters grouped; but it is evident that by increasing the sides of the guide-frame a greater number of cutters may be used, and thus a greater length of molding cut in a single operation.

Various kinds of knives may be used, each cutting one single part or bead of the molding, or each cutter cutting one bead, the two half-beads, and so on.

Having thus described my invention, I claim as new and desire to secure by Letters Patent—

1. In a lathe attachment for turning moldings, the combination, with a frame, of a swinging frame in the same, a series of rock-shafts in said swinging frame, cutters on the rock-shafts, and rods uniting the several rock-shafts with a common handle, substantially as set forth.

2. The combination, with a frame, of a swinging frame in the same, a spring for pressing said frame upward, a cam for pressing it downward, a series of rock-shafts in said frame and cutters on the rock-shafts, and rods uniting the several rock-shafts with a common handle, substantially as set forth.

3. The combination, with a frame, of a swinging frame in the same, vertically-adjustable independent bearing-pieces on the swinging frame, a rock-shaft in each pair of bearing-pieces, cutters on the rock-shafts, and rods uniting the several rock-shafts with a common handle, substantially as set forth.

4. The combination, with a frame, of a series of cutters, a rock-shaft carrying two arms a short distance from each other, each arm being provided with a marking or gage blade, and mechanism for manipulating said arms, substantially as set forth.

5. The combination, with a frame, of a swinging frame in the same, rocking shafts having cutters mounted in said swinging frame, a cam-lever acting on the swinging frame, a shaft provided with two arms a short distance from each other, marking-blades on said arms, one of said arms being connected with the cam-shaft, substantially as set forth.

6. The combination, with a frame, of a slotted guide-sleeve in the same, a swinging frame mounted in the above-mentioned frame, rocking shafts in the swinging frame, and cutters on said rocking shafts, substantially as set forth.

7. The combination, with a frame, of a swinging frame in the same, rocking shafts in said swinging frame, cutters on the rocking shafts, a rod on each shaft, the free ends of said rods being slotted, and a common handle-piece connected with the slotted ends of said bars, substantially as set forth.

In testimony that I claim the foregoing as my invention I have signed my name in presence of two subscribing witnesses.

JULIUS F. GEBHARDT.

Witnesses:
OSCAR F. GUNZ,
JOHN A. STRALEY.